United States Patent
Barnes et al.

(10) Patent No.: US 8,110,704 B2
(45) Date of Patent: *Feb. 7, 2012

(54) PROCESS FOR THE PRODUCTION OF STABLE POLYMERS

(75) Inventors: James Michael Barnes, Breitscheid-Hochscheid (DE); Hartmut Nefzger, Pulheim (DE); Erika Bauer, Juchen (DE); Stefan Penninger, Pulheim (DE); Thomas Schultz, Leverkusen (DE); Heinrich Lutz, Reichshof (DE); Horst Di Mews, Leverkusen (DE); Charles S. Gracik, McMechan, WV (US)

(73) Assignees: Bayer MaterialScience LLC, Pittsburgh, PA (US); Bayer MaterialScince AG, Leverkusen (DE)

( * ) Notice: Subject to any disclaimer, the term of this patent is extended or adjusted under 35 U.S.C. 154(b) by 721 days.

This patent is subject to a terminal disclaimer.

(21) Appl. No.: 11/591,779

(22) Filed: Nov. 2, 2006

(65) Prior Publication Data
US 2008/0108776 A1    May 8, 2008

(51) Int. Cl.
*C07C 265/00* (2006.01)
*C07C 291/00* (2006.01)
*C08F 6/00* (2006.01)
*C08J 3/00* (2006.01)

(52) U.S. Cl. ............ 560/358; 560/25; 560/26; 560/132; 560/158; 560/351; 560/352; 528/44; 528/48; 528/73; 528/76; 528/77; 528/85; 528/503

(58) Field of Classification Search ............ 528/66, 528/67, 76, 44, 73, 77, 59, 48, 85, 503; 521/172, 521/174; 560/25, 26, 132, 158, 358, 351, 560/352

See application file for complete search history.

(56) References Cited

U.S. PATENT DOCUMENTS

| | | | | |
|---|---|---|---|---|
| 3,179,625 | A * | 4/1965 | Ehrhart | 528/48 |
| 3,691,117 | A * | 9/1972 | Messerly et al. | 524/349 |
| 4,115,429 | A | 9/1978 | Reiff et al. | 260/453 SP |
| 4,118,411 | A | 10/1978 | Reiff et al. | 260/453 SP |
| 4,490,300 | A | 12/1984 | Allen et al. | 260/453 SP |
| 4,720,535 | A * | 1/1988 | Schleier et al. | 528/59 |
| 4,738,991 | A | 4/1988 | Narayan | 521/124 |
| 5,440,003 | A | 8/1995 | Slack | 528/48 |
| 6,310,114 | B1 * | 10/2001 | Genz et al. | 521/159 |
| 6,515,125 | B1 | 2/2003 | Slack et al. | 544/222 |
| 2002/0123594 | A1 * | 9/2002 | Hoffmann et al. | 528/44 |
| 2004/0102536 | A1 | 5/2004 | Bollmann et al. | 521/155 |
| 2005/0062932 | A1 * | 3/2005 | Kosaka et al. | 351/159 |

FOREIGN PATENT DOCUMENTS

| CN | 2119001 | * | 9/1994 |
| EP | 1 873 178 A2 | | 1/2008 |

OTHER PUBLICATIONS

Solid Polyurethane Elastomers (month unavailable) 1969, chapter 6.2, p. 104-122, P. Wright and A.P.C. Cumming, "Cast Polyurethanes".

* cited by examiner

*Primary Examiner* — Milton I Cano
*Assistant Examiner* — Michael L Leonard
(74) *Attorney, Agent, or Firm* — Lyndanne M. Whalen; Nolasn J. Cheung

(57) ABSTRACT

Stable NCO prepolymers are produced from polyisocyanates having a melting point greater than 70° C., preferably, naphthalene diisocyanate, having advantageous physical properties. An important feature of the process of the present invention is the rapid cooling of the prepolymer. The process of the present invention may be carried out on a continuous or batch basis. The prepolymers of the present invention are particularly suitable for the production of cast polyurethane elastomers.

5 Claims, No Drawings

PROCESS FOR THE PRODUCTION OF STABLE POLYMERS

BACKGROUND OF THE INVENTION

The present invention relates to a process for the production of stable prepolymers and the production of polyurethane elastomers from such prepolymers.

Prepolymers are NCO-group-terminated polymers that are obtained by reacting a polyol with a polyisocyanate in molar excess, based on functional groups, at a temperature of from room temperature to about 100° C. (in special cases also over 100° C.) until a constant NCO value is reached.

An important application for such NCO-terminated prepolymers is the production of elastomers by the casting process. In the production of such elastomers, the prepolymer either undergoes chain extension immediately after production (i.e. reaction, with a short-chain polyol (e.g., 1,4-butanediol) or with a polyamine (e.g., methylene bis(orthochloroaniline)) or with water), or the NCO prepolymer is cooled (to the extent that it is advantageous and possible) to a lower temperature (storage temperature) for the purpose of a subsequent chain extension and stored.

Elastomers which are produced with prepolymers on the basis of high-melting polyisocyanates exhibit better properties than those which are based on low-melting polyisocyanates or those that are liquid at room temperature, such as toluene diisocyanate (TDI) or diphenylmethane diisocyanate (MDI), for example.

Cast elastomers can be obtained in principle not only by the prepolymer process but also by the one-shot process in which a mixture of long-chain and short-chain polyols is reacted with one or more polyisocyanates. The disadvantage of the one-shot process, however, is that only low-grade elastomers are obtained, especially if high-melting polyisocyanates are used, because intermediates formed by short-chain polyol (chain extender) and high-melting polyisocyanate are precipitated out of the reaction melt in some cases and therefore undergo a further reaction, preventing further ordered molecular weight development. This is one reason why the prepolymer process normally leads to better products.

Another favorable feature of the prepolymer synthesis route is that a portion of the heat of reaction is already removed by the prepolymer step, so the exothermic heat of reaction generated during the actual polymer formation process is smaller. This has a favorable effect on the speed of molecular weight development and allows longer casting times—a processing advantage.

The prepolymer synthesis route is particularly advantageous for MDI-based systems (melting point of the 4,4'-isomer approx. 42° C.) because the polyisocyanate melting point is lowered with prepolymerization. MDI may be brought to a form that is liquid at room temperature through prepolymerization (i.e., formation of an NCO prepolymer), which naturally makes processing significantly simpler in comparison to the solid form. MDI prepolymerization also slows the undesirable dimerization of the monomeric polyisocyanate down markedly.

U.S. Pat. No. 6,515,125 teaches that partially trimerized polyisocyanate prepolymers of toluene diisocyanate (TDI) or diphenylmethane diisocyanate (MDI) are stable in liquid form without formation of solids.

It is also possible to incorporate allophanate groups in MDI-type NCO prepolymers (U.S. Pat. No. 5,440,003), as a result of which storage stability can likewise be achieved in the liquid state at 25° C. This is achieved in a manner analogous to that disclosed in U.S. Pat. No. 4,738,991.

However, neither trimerization nor incorporation of allophanate groups can be used for a high-melting polyisocyanate such as NDI because unlike MDI, NDI displays a markedly lower tendency towards trimerization and allophanate groups incorporated in NDI-based systems lead to a very sharp rise in viscosity.

A number of possibilities for providing MDI at room temperature in the form of stable, liquid NCO prepolymers are also described in the literature. In U.S. Pat. Nos. 4,115,429 and 4,118,411 this object was achieved by reacting (a) specific amounts of 2,4'-isomers mixed with 4,4'-isomers with (b) propylene glycol or poly-1,2-propylene glycol. However, in glycol-extended systems, the use of mixtures of isomers leads to elastomers having inferior properties. The same applies to mixtures of isomers of phenylene diisocyanate. The use of mixtures of isomers has to be ruled out for NDI, however, due to lack of commercial availability.

In U.S. Pat. No. 4,490,300, the crystallization of MDI is prevented by reaction with a diol carrying bulky groups, such as 2-methyl-2-phenyl-1,3-propanediol or phenyl-1,2-ethanediol. The disadvantage of this approach, however, is that the rigid segments are formed in a less ordered manner resulting in a deterioration in properties, which for NDI-based polyurethane (PU) elastomers is unacceptable due to the extremely demanding applications for which they are used.

In the case of MDI, a lowering of the melting point by from 15° C. to 40° C. to from 0° C. to 25° C. can be achieved, e.g., by reaction with a diol. The object is thus satisfactorily achieved for MDI-containing systems and is also used in industry.

In the prepolymer process, however, a whole series of boundary conditions are critical and must be observed. These are, in particular, the storage stability of the prepolymer and the viscosity of the prepolymer. In addition, as mentioned above, the measures taken to liquefy the polyisocyanate, i.e. lowering the polyisocyanate melting point, must not adversely affect the PU properties in the particular applications to any great extent.

It is desirable for NCO prepolymers to be stable at the storage temperature, i.e. as far as possible for no secondary reactions to take place and for the viscosity to change only slightly over time and remain within the processing window.

In some systems, moreover, high concentrations of free monomeric polyisocyanate are undesirable due to toxicological problems. The free monomeric polyisocyanates can largely be removed from the prepolymer by thin-film or short-path evaporation. This procedure is very expensive, however, and also leads to elastomers having inferior properties because the length of the rigid segments remains restricted to building blocks made up of only two diisocyanate molecules and one chain-extender molecule.

In the case of NDI, however, not only is this measure not absolutely necessary because of its higher boiling point in comparison to TDI and para-phenylene diisocyanate (PPDI), for example, but it can only be implemented on an industrial scale at significantly increased cost, even though it would solve the problem of sedimentation stability as discussed below.

Prepolymers having a relatively low content of free polyisocyanate can be produced comparatively easily, particularly if polyisocyanates having differently reactive NCO groups are used, because the more reactive NCO group in each case is preferentially attached to the polyol. Examples of such prepolymers are NCO prepolymers based on 2,4-toluylene diisocyanate or isophorone diisocyanate (IPDI). Further, the differently reactive NCO groups also allow the stoichiometry of NCO to OH groups to be reduced to well below 2:1, because the increase in viscosity is restricted to a minimum because of a pre-extension of the polyol.

In the case of 1,5-NDI, the NCO groups are practically identical in terms of their reactivity. Therefore, if the stoichiometry is reduced below 2:1, the proportion of free monomeric polyisocyanate in the NCO prepolymer is smaller, albeit at a higher level than with analogous 2,4-TDI and 2,4'-MDI systems, but the extent of pre-extension and resultant increase in viscosity are much more apparent. A sharply increased viscosity is very disadvantageous for PU applications. An elevated viscosity is a considerable processing disadvantage, so the stoichiometry of NCO and OH groups, particularly in the case of NDI-based prepolymers, must be chosen with special care.

It is also known that the viscosity of NCO-prepolymers based on polypropylene glycols is lower than that of NCO prepolymers based on polyadipate polyols under otherwise identical conditions. The chemical structure of the structural components has an evident effect on the properties.

It is also known that the viscosity of the prepolymer can be kept low if the polyisocyanate is used in large molar excess.

NCO prepolymers based on TDI or MDI, for example, are produced by preparing the liquid, optionally molten, polyisocyanate and slowly adding the polyol. This procedure ensures that at any stage of the reaction, the NCO groups are in excess in comparison to the hydroxyl groups. This measure prevents pre-extension of the polyol and has a favorable effect on the viscosity of the NCO prepolymer. This procedure cannot be used for NDI prepolymers, however, because the use of molten polyisocyanate would in this case mean that the reaction would have to be performed above the melting point of NDI (approx. 127° C.), which in addition to all the plant engineering challenges would also mean that all reaction paths leading to viscosity-raising structural elements would be open to the developing NCO prepolymers for some time.

It is clear from the discussion above that prepolymers based on high-melting polyisocyanates, such as NDI, present a very particular technical challenge. It would be desirable to remove (e.g., by distillation methods) the high-melting polyisocyanates which as monomers have a particular tendency to crystallize out of prepolymers. Such removal is either not feasible or feasible only with considerable technical difficulty because of the high boiling point associated with the high melting point of such polyisocyanates. The measures suitable for other polyisocyanates, such as varying the stoichiometry, incorporating crystallization-inhibiting additives, etc., are impossible or possible only within limits for the reasons already specified.

The production of useable and stable NCO prepolymers based on NDI is therefore unsuccessful with the aforementioned measures.

As already stated above, NCO prepolymers which have not been subjected to a thin-film or short-path evaporation stage, always contain monomeric, unreacted polyisocyanate molecules. In the case of NDI, they are characterised by poor solubility in the NCO prepolymer, such that at low temperatures they crystallize out. Further, due to its high density, crystallized high-melting polyisocyanate settles at the bottom of the storage vessel. This means that the storage containers would also have to be stirred with a bottom-driven impeller. Not only are sediment-containing prepolymers unsuitable for the chain-extension reaction because extension cannot take place, or cannot take place to a sufficient extent, but they also always present the risk of blockages in pipes and machines. Until now, such NCO prepolymers have therefore had to undergo further processing immediately after production, since they allow only extremely short storage periods at the necessary high temperatures.

Additionally, the NCO prepolymers based on NDI cannot be converted to the liquid state by heating without a corresponding negative effect on the viscosity and the NCO content. For the purposes of homogenization prior to chain extension, prepolymers based on high-melting polyisocyanates would have to be heated to an adequate temperature either to dissolve or to melt solid polyisocyanate in the NCO prepolymer. This process is not only cost-intensive but due to the elevated temperature it also leads to an increase in secondary reactions and hence to a sharp rise in viscosity and a reduction in the NCO content, such that the prepolymers are or become unusable.

These problems, in particular in relation to NDI prepolymers, are summarized in "Solid Polyurethane Elastomers", P. Wright und A. P. C. Cummings, Maclaren and Sons, London 1969, page 104 et seq./chapter 6.2, as follows:

6.2.1. Unstable Prepolymer Systems (Vulkollan)

Vulkollan is manufactured by a prepolymer route, although the prepolymer is non-storable and must be further reacted within a short interval of time . . . . The prepolymer so formed is relatively unstable since further undesirable side reactions can take place. To reduce the possibility of these side reactions occurring, the next stage in the process, viz. the chain extension, should take place as soon as possible but within a maximum of 30 minutes."

In view of the above-discussed problems and the fact that there are no commercially available NCO prepolymers produced from NDI and that as a consequence the advantages of preproduced NCO prepolymers in the production of polyurethane cast elastomers have, until now, had to be forgone, gives rise to the object of the present invention.

SUMMARY OF THE INVENTION

An object of the present invention is to provide a process which does not exhibit the above-described disadvantages and provide NCO prepolymers which are stable and homogeneous or capable of forming a stable and clear melt and which have useable viscosities at the processing temperature.

A further object of the present invention was to provide a process for the production of elastomers from such prepolymers, wherein the properties of these elastomers correspond as closely as possible to the properties of those cast elastomers obtained with the known processes.

Surprisingly, these objects are achieved by the process for the production of stable prepolymers based on high-melting polyisocyanates, most preferably NDI, described in greater detail below. While the process of the present invention is described in greater detail with specific reference to NDI, the process of the present invention can also be practiced using other high-melting polyisocyanates (i.e., polyisocyanates with melting points or melting ranges of higher than 70° C.) such as p-phenylene diisocyanate (PPDI) and 3,3'-dimethyl4, 4'-biphenyl diisocyanate (TODI).

DETAILED DESCRIPTION OF THE INVENTION

The present invention provides a process for producing stable NCO prepolymers having an NCO content of from 2.5 to 6 wt. % and a viscosity measured at 100° C. of <5000 mPas which are based on a high melting polyisocyanate, preferably, 1,5-naphthalene diisocyanate (NDI) in which a) a high melting polyisocyanate, preferably, 1,5-naphthalene diisocyanate (NDI) is reacted (either continuously or on a batch basis) with
b) one or more polyols having an average molecular weight of from 1000 to 3000 g/mol, a viscosity of <700 mPas (measured at 75° C.) and a functionality of from 1.95 to 2.15, preferably selected from the group comprising polyester polyols, poly-ε-caprolactone polyols, polycarbonate polyols, polyether polyols and α-hydro-ω-hydroxypoly(oxytetramethylene) polyols in a ratio of NCO to OH groups of from 1.55:1 to 2.35:1, preferably from 1.60:1 to 2.15:1, at a temperature of 80° C. to 240° C.,
c) optionally, in the presence of one or more auxiliary substances and additives,
    with rapid cooling of the reaction mixture, in which the unreacted NDI still present after the conversion reaction is not removed (by thin-film or short-path evaporation, for example) and is present in amounts of more than 0.3 wt. %, preferably more than 1 wt. %, and less than 5 wt. %, based on the weight of the prepolymer.

Suitable polyester polyols include those produced in accordance with the prior art usually by polycondensation of a polycarboxylic acid with a molar excess of polyol. Poly-ε-caprolactone polyols are obtained by ring-opening polymerization of ε-caprolactone using bifunctional starter molecules, including water, but usually aliphatic polyols.

Polycarbonate polyols are compounds containing hydroxyl end groups and on average at least 3 carbonate groups. Polyether polyols are predominantly polypropylene or polypropylene co-ethylene oxides polymerized with bifunctional starters. α-Hydro-ω-hydroxy-poly(oxytetramethylene)polyols are obtained by the ring-opening polymerization of tetrahydrofuran.

Production of prepolymers in accordance with the present invention takes place, contrary to known methods, by heating the polyol to a temperature of from 80 to 160° C. and mixing the heated polyol with the high-melting polyisocyanate. The exact starting temperature for prepolymer formation depends on the size of the batch and the nature of the vessel and is readily determined in preliminary tests to establish that the temperatures reached due to the exothermic nature of the reaction are sufficient to melt the high-melting solid polyisocyanate that is used in the reaction mixture or to obtain a clear, homogeneous melt. If 1,5-NDI is used, the necessary temperature is in the range of from around 120 to 135° C., preferably from 125 to 130° C. After obtaining a clear, homogeneous melt (end of reaction), the NCO prepolymer is rapidly cooled to below 70° C., transferred into storage or transport containers and then stored at room temperature. Rapid cooling (from the temperature at the end of the reaction) to below 70° C. means, in connection with the process according to the invention, the following:

A) a maximum residence time of ½ hour in the temperature range from the temperature at the end of the reaction to a temperature of 130° C. and
B) a maximum residence time of 1.5 hours in the temperature range from the temperature at the end of the reaction to a temperature of 110° C. and
C) a maximum residence time of 7.5 hours in the temperature range from the temperature at the end of the reaction to a temperature of 90° C. and
D) a maximum residence time of 72 hours from the temperature range at the end of the reaction to a temperature of below 70° C.

The smaller the quantity of NCO prepolymer to be cooled, the easier it is technically to adhere to the above specifications. On a laboratory scale, i.e. in the case of quantities of up to about 10 kg, it may in some cases be sufficient to conduct the cooling process with air, or possibly liquid media, such as a water or oil bath. On an industrial scale, i.e. in the case of quantities such as 100 kg or 5 tons, it is possible to use not only effective heat exchange systems but also the usually less costly alternative of discharging the hot reaction product into older, already cooled material, accompanied by intense stirring or recycling. In this case, the already cooled material is contained in a stirred vessel the temperature of which is selected, depending on the quantitative ratio of new to old material, so that the temperature of the mixture at the end of the discharge step is no higher than 100° C. The discharge process itself must be designed to enable all of the parameters with regard to the cooling rate to be adhered to for all portions of the old and the new product. The resulting mixture of old and new product portions, which has been cooled to temperatures of no higher than 100° C., is then further cooled to a temperature below 70° C., possibly by cooling the vessel. In this phase of the process, the procedure for filling the storage containers is carried out in a manner which ensures not only that sufficient product remains in the discharge container at a temperature such that the next partial batch of prepolymer is cooled to the above-mentioned temperature, but also that the overall temperature exposure is minimized.

For the production of sizeable amounts of prepolymer, however, it is often easier and less expensive to carry out the production continuously using reaction extruders rather than batchwise in reaction vessels.

The production of NCO prepolymers in reaction extruders is known. In the production of thermoplastic polyurethanes, the extruder method is likewise used. In the extrusion of thermoplastic polyurethanes, the NCO prepolymer is not isolated as such but is reacted further directly in the reaction extruder to form the thermoplastic polyurethane. DE-A 42 17 367 describes how substantially linear polyester polyols having molecular weights of from 500 to 5000 g/mol are reacted with diisocyanates having the formula OCN-Z-NCO in an NCO/OH ratio of from 1.1 to 5.0 to form NCO prepolymers. 4,4'-Diphenylmethane diisocyanate and 1,5-naphthalene diisocyanate are preferably used here.

In one embodiment of the process of the present invention, the NCO-prepolymer is continuously in a reaction extruder. The reaction mixture composed of polyol and aromatic diisocyanate is heated in one of the first zones of the extruder to temperatures of at least 180° C. up to max. 240° C. and in the subsequent zones of the extruder, with application of a partial vacuum to bring about extensive degassing, it is rapidly cooled to temperatures of preferably below 100° C., preferably below 80° C. The melt obtained is transferred into vessels filled with inert gas.

When using the extruder embodiment of the present invention, an anti-ageing agent is generally introduced into the polyol mixture.

When using a reaction extruder, it is of course relatively simple to adhere to the conditions for the cooling process defined above by selecting a suitable flow rate in addition to adjusting the temperatures in the individual heating and cooling zones.

The polyols used to produce the NCO prepolymers are preferably stored in a storage vessel at an elevated temperature prior to their use. It has proven advantageous to store polyester polyols at a temperature range of from 100 to 140° C. and to store the polyether polyols at temperatures of from 80 to 120° C.

In order to produce cast elastomers, the NCO prepolymers of the present invention are heated to elevated temperature and reacted with one or more chain extenders.

Suitable chain extenders are known to those skilled in the art.

Suitable chain extenders include: linear, aliphatic α,ω-diols having from 2 to 12 C atoms; aromatic polyamines; and water. Butanediol, hexanediol, ethoxylated hydroquinone and cyclohexanediol, individually or mixed together are preferred. Other possible reaction components, in addition to the chain extenders, are the polyols used to produce the NCO prepolymers, and also those that are not a constituent of the prepolymer but are phase-compatible with them, for example polyadipate polyols. It is preferred that only such combinations that do not lead to a phase separation be used. Higher-functional polyols, such as triols (e.g., 1,1,1-trimethylol propane), can also be used in small quantities additionally or exclusively in the production of cast elastomers, preferably along with water as the chain extender.

The auxiliary substances and additives known from the prior art, such as catalysts, stabilizers and emulsifiers, for example, can also be included.

Examples of suitable catalysts are trialkylamines, peralkylated polyamines, diazabicyclooctane, tin dioctoate, dibutyl tin dilaurate, N-alkyl morpholine, lead, zinc, calcium, magnesium octoate, the corresponding naphthenates, p-nitrophenolate, etc.

Examples of suitable stabilizers are Brøonsted and Lewis acids, such as hydrochloric acid, benzoyl chloride, organomineral acids (e.g., dibutyl phosphate), also boron trichloride, adipic acid, glutaric acid, succinic and malic acid, racemic acid, citric acid, etc.

UV stabilizers, such as 2,6-dibutyl-4-methylphenol, hydrolysis stabilizers (e.g., carbodiimides), as well as emulsifiers, foam stabilizers, cell regulators, blowing agents, flame retardants and fillers, can also be used. Suitable auxiliary substances and additives are disclosed, for example, in G. Oertel, Polyurethane Handbook, $2^{nd}$ edition, Carl Hanser Verlag, Munich, 1994, chapter 3.4.

The prepolymers produced in accordance with the present invention are useful for the production of foamed or unfoamed cast elastomers.

The procedure for producing cast elastomers based on the prepolymers produced according to the invention is, in principle, the same as that for producing cast elastomers based on other prepolymers. Reference is made in this connection to the known prior art.

The invention is illustrated in more detail by means of the examples below.

EXAMPLES

Production and Properties of NCO Prepolymers

Example 1

According to the Invention 100 parts by weight of a neopentyl glycol-started poly-ε-caprolactone having a hydroxyl value of 72 mg KOH/g were dehydrated and mixed at 118° C. with 26.03 parts by weight of Desmodure® 15 (naphthalene diisocyanate from Bayer MaterialScience AG). After 11 minutes, the reaction temperature rose to 129° C. The mixture was cooled in 10 minutes to 65° C. The prepolymer was divided into several samples and the samples tested after various storage times. The viscosity (measured at 120° C.), the appearance (assessed at a temperature of 50° C.) and the NCO value were determined (See Table 1.).

TABLE 1

Storage conditions and properties of the prepolymer

| Prepolymer no. | Storage temperature [° C.] | Time [h] | Viscosity [mPas] at T | NCO value [wt. % NCO] | Appearance [at 50° C.] |
|---|---|---|---|---|---|
| 1.1 | 65 | 16 | 1320 at 120° C. | 3.9 | clear |
| 1.2 | 80 | 48 | 1440 at 120° C. | 3.8 | clear |
| 1.3 | 100 | 24 | 1920 at 120° C. | 3.6 | clear |
| 1.4 | 23 | 1000 | 1320 at 120° C. | 3.9 | clear |
| 1.5 | 23 | 0 | 1320 at 120° C. | 3.9 | clear |

The storage conditions chosen in Table 1 cover various conceivable temperature loads to which the prepolymer could be exposed after production. For instance, "16 h at 65° C." (Prepolymer 1.1, Table 1) simulates the cooling process which the prepolymer could undergo after being introduced into smaller containers, e.g., 60 liter cans, in the worst-case scenario. "48 h at 80° C." (Prepolymer 1.2, Table 1) and "24 h at 100° C." (Prepolymer 1.3, Table 1) could be heating operations prior to further processing. "1000 h at 23° C." (Prepolymer 1.4, Table 1) is a period of time required between production and further processing. Here the viscosity value is the same as that at the start of storage at room temperature (Prepolymer 1.5, Table 1). This shows that after production, storage and conversion to a useable state (heating), the prepolymers of the present invention are suitable for producing cast elastomers.

Production of Cast Elastomers using the Prepolymers from Example 1

Example 2

According to the Invention 100 parts by weight of the NCO prepolymers from Example 1 stored for varying lengths of time and at different temperatures were heated to 110° C., degassed and mixed with 3.55 parts by weight of 1,4-butanediol. The reaction mixture was poured into a mold preheated to a temperature of from 108° C. to 110° C., demolded after 18 minutes, and conditioned in a circulating air drying oven for 16 hours at 110° C. The mechanical properties were determined (See Table 2.).

TABLE 2

Formulation, production and properties of cast elastomers using the prepolymers from Example 1

| | Cast elastomer | | A | B | C | D |
|---|---|---|---|---|---|---|
| Prepolymer storage conditions: | Prepolymer | | 1.1 | 1.2 | 1.3 | 1.4 |
| | Storage time | [h] | 16 | 48 | 24 | 1000 |
| | Storage temperature | [° C.] | 65 | 80 | 100 | 23 |
| | NCO (theoretical) | [wt. %] | 3.98 | 3.98 | 3.98 | 3.98 |
| | NCO (measured) | [wt. %] | 3.9 | 3.8 | 3.6 | 3.9 |

TABLE 2-continued

Formulation, production and properties of cast elastomers using the prepolymers from Example 1

|  | Cast elastomer |  | A | B | C | D |
|---|---|---|---|---|---|---|
| Formulation: | Prepolymer | [pts by wt.] | 100 | 100 | 100 | 100 |
|  | 1,4-Butanediol | [pts by wt.] | 3.55 | 3.55 | 3.55 | 3.55 |
|  | Theoretical characteristic value |  | 121 | 121 | 121 | 121 |
| Processing: | Prepolymer temperature | [° C.] | 110 | 110 | 110 | 110 |
|  | Butanediol temperature | [° C.] | 23 | 23 | 23 | 23 |
|  | Casting time | [s] | 195 | 255 | 240 | 210 |
|  | Release time | [min] | 11 | 11 | 12 | 12 |
|  | Mold temperature | [° C.] | 108 | 108 | 108 | 110 |
|  | Demolding after | [min] | 18 | 18 | 18 | 18 |
| Mechanical properties: | Hardness, DIN 53505 | [Shore A] | 95 | 95 | 94 | 91 |
|  | Hardness, DIN 53505 | [Shore D] | 45 | 38 | 36 | 46 |
|  | Stress 100%, DIN 53504 | [MPa] | 10.55 | 10.67 | 9.54 | 11.31 |
|  | Stress 300%, DIN 53504 | [MPa] | 15.44 | 16.11 | 16 | 16.86 |
|  | Yield stress, DIN 53504 | [MPa] | 42.4 | 47.7 | 46.6 | 44.14 |
|  | Elongation at break, DIN 53504 | [%] | 611 | 596 | 522 | 559 |
| DIN 53515 | Tear propagation strength | [kN/m] | 47.97 | 44.12 | 33.28 | 54.6 |
| DIN 53516 | Abrasion | [mm$^3$] | 34 | 40 | 43 | 28 |
| DIN 53420 | Density | [g/mm$^3$] | 1.159 | 1.16 | 1.15 | 1.161 |
| DIN53517 | Compression set, 70° C. | [%] | 27.3 | 28.1 | 27.6 | 26 |

Production of NCO Prepolymers According to the Invention and Not According to the Invention.

Example 3

The prepolymers were produced as described in Example 1. The formulations and the properties of the prepolymers can be found in Table 3.

TABLE 3

|  |  | Formulation: | | | | | | |
|---|---|---|---|---|---|---|---|---|
|  |  | 3.1 C | 3.2 C | 3.3 | 3.4 | 3.5 | 3.6 | 3.7 C |
| Poly-ε-caprolactone*) | [pts by wt.] | 80 | 80 | 80 | 80 | 80 | 80 | 80 |
| NDI | [pts by wt.] | 11.55 | 14.70 | 18.38 | 20.48 | 20.48 | 24.15 | 28.35 |
| Molar ratio of NDI to poly-ε-capro-lactone |  | 1.1:1 | 1.4:1 | 1.75:1 | 1.95:1 | 1.95:1 | 2.3:1 | 2.7:1 |
| Free NDI (theor.) | [wt. %] | 0.60 | 1.00 | 1.49 | 2.38 | 2.38 | 3.50 | 4.00 |
| Polyol start temp. | [° C.] | 112 | 116 | 118 | 117 | 117 | 122 | 125 |
| Exothermic, T$_{max}$ | [° C.] | 129.5 | 128.1 | 129.5 | 127.6 | 127.3 | 125.9 | 125.7 |
| Reaction time to T$_{max}$ | [min] | 16 | 13 | 17 | 11 | 16 | 12 | 12 |
| NCO, theor. | [wt. %] | 0.46 | 1.77 | 3.20 | 3.98 | 3.98 | 5.24 | 6.58 |
| NCO, found | [wt. %] | 0.28 | 1.58 | 2.95 | 3.66 | 3.72 | 5.03 | 6.32 |
| Viscosity**) | [mPas@120° C.] | >100000 | 8700 | 1650 | 1110 | 1050 | 625 | 435 |
| Viscosity**) | [mPas@100° C.] | >100000 | 18500 | 3100 | 2150 | 2050 | 1020 | 815 |
| Viscosity after storage: |  |  |  |  |  |  |  |  |
| 24 h at 100° C. | [mPas@120° C.] | n.d. | 15200 | 4550 | 2700 | 2600 | 1220 | 875 |
| 24 h at 100° C. | [mPas@100° C.] | n.d. | 38900 | 10400 | 4850 | 4700 | 2120 | 1700 |
| 48 h at 80° C. | [mPas@120° C.] | n.d. | 14700 | 2350 | 1350 | 1350 | 800 | 545 |
| 48 h at 80° C. | [mPas@100° C.] | n.d. | 35400 | 4700 | 2400 | 2430 | 1500 | 1035 |
| 1.5 months/room temp. | [mPas@120° C.] | n.d. | 10700 | 1900 | 1250 | 1100 | 700 | 540 |
| 1.5 months/room temp. | [mPas@100° C.] | n.d. | 23000 | 3700 | 2450 | 2250 | 1405 | 1114 |

TABLE 3-continued

| | | Formulation: | | | | | | |
|---|---|---|---|---|---|---|---|---|
| | | 3.1 C | 3.2 C | 3.3 | 3.4 | 3.5 | 3.6 | 3.7 C |
| NCO after storage: | | | | | | | | |
| 24 h at 100° C. | [wt. %] | n.d. | 1.38 | 2.63 | 3.37 | 3.32 | 4.54 | 5.79 |
| 48 h at 100° C. | [wt. %] | n.d. | 1.47 | 2.78 | 3.56 | 3.59 | 4.72 | 5.97 |
| 1.5 months/ room temp. | [wt. %] | n.d. | 1.51 | 2.86 | 3.58 | 3.64 | 4.78 | 6.42 |
| Aggregate condition at room temp.: | | | | | | | | |
| After 1 day | | solid | cloudy | clear | clear | clear | clear | cloudy |
| After 3 days | | solid | cloudy | clear | clear | clear | clear[+) | solid |
| After 7 days | | solid | cloudy | cloudy | clear | clear | clear[+) | solid |
| Specks after 1.5 months | | solid | no | no | yes | yes | yes | yes |
| Forms a clear melt at | [° C.] | | 50 | 50 | 60 | 50 | 85 | >95 |

*)neopentyl glycol-started poly-ε-caprolactone with a hydroxyl value of 72 mg KOH/g
**)viscosity values determined with a Haake viscometer
+)clear, traces of solid NDI C comparison The examples in Table 3 show that only prepolymers in which the molar ratios of the diisocyanate to the polyol are within the range required in Applicants' invention (formulations 3.3 to 3.6, Table 3) are useable, i.e. in terms of both their melting characteristics and their rheology, particularly also the rheology after storage.

Production of Cast Elastomers According to the Invention and Not According to the Invention Using Prepolymers According to the Invention and Not According to the Invention from EXAMPLE 3

Example 4

The cast elastomers were produced using the procedure described in Example 2.

Table 4 sets out the formulations, processing conditions and mechanical properties of the cast elastomers (F to K) produced using the corresponding prepolymers. Due to its high viscosity, Prepolymer 3.1 C (not according to the invention) could not be converted to a cast elastomer. This was still possible with Prepolymers 3.2 C and 3.7 C, likewise not according to the invention, although only by accepting a higher starting temperature in the case of Prepolymer 3.2 C (cast elastomer F).

TABLE 4

| | | | E | F | G | H | I | J | K |
|---|---|---|---|---|---|---|---|---|---|
| Prepolymer storage conditions | Storage time | [h] | 16 | 16 | 16 | 16 | 16 | 16 | 16 |
| | Storage temperature | [° C.] | 65 | 65 | 65 | 65 | 65 | 65 | 65 |
| Formulation: | Prepolymer no. | [100 pts] | 3.1 C | 3.2 C | 3.3 | 3.4 | 3.5 | 3.6 | 3.7 C |
| | NCO (theor.) | [wt. %] | 0.50 | 1.77 | 3.20 | 3.98 | 3.98 | 5.24 | 6.58 |
| | Crosslinker B | [pts by wt.] | n/a | 1.65 | 2.98 | 3.71 | 3.71 | 4.88 | 6.13 |
| | Characteristic value | | | 115 | 115 | 115 | 115 | 115 | 115 |
| Processing: | Prep. temperature | [° C.] | | 130 | 110 | 110 | 110 | 110 | 110 |
| | Crosslinker temperature | [° C.] | | 23 | 23 | 23 | 23 | 23 | 23 |
| | Casting time | [s] | | 150 | 135 | 140 | 105 | 60 | |
| | Release time | [min] | | 18 | 10 | 10 | 8 | 6 | |
| | Table temperature | [° C.] | | 125 | 125 | 125 | 125 | 125 | |
| | Mold temperature | [° C.] | | 116 | 116 | 116 | 116 | 116 | |
| | Demolding after | [min] | | 18 | 25 | 18 | 18 | 18 | 18 |
| Mechanical properties: | Hardness (DIN 53505) | [Shore A] | | 80 | 91 | 92 | 91 | 93 | 93 |
| | DIN 53504 Stress 100% | [MPa] | | 4.86 | 8.02 | 9.85 | 10.23 | 12.7 | 14.38 |
| | DIN 53504 Stress 300% | [MPa] | | 8.14 | 12.07 | 15.08 | 16 | 18.87 | 21.62 |
| | DIN 53504 Yield stress | [MPa] | | 18.93 | 31.56 | 45.5 | 46.15 | 42.92 | 33.51 |
| | DIN 53504 Elongation at break | [%] | | 551 | 633 | 570 | 541 | 523 | 437 |

TABLE 4-continued

|  |  |  | E | F | G | H | I | J | K |
|---|---|---|---|---|---|---|---|---|---|
| DIN 53515 | Tear prop. strength | [kN/m] |  | 43.9 | 39.6 | 43.8 | 47.5 | 55.6 | 57.2 |
| DIN 53516 | Abrasion | [mm³] |  | 96 | 49 | 33 | 44 | 33 | 41 |
| DIN 53420 | Density | [g/mm³] |  | 1.141 | 1.153 | 1.158 | 1.159 | 1.167 | 1.176 |
| DIN 53517 | CS 22° C. | [%] |  | 30.8 | 22.7 | 21.1 | 22.2 | 32.4 | 7.2 |
| DIN 53517 | CS 70° C. | [%] |  | 66.1 | 48.3 | 31.5 | 36.6 | 34.7 | 28.9 |
| DIN 53517 | CS 100° C. | [%] |  | 83.9 | 58.1 | 42.3 | 43.4 | 41.8 | 39 |
| DIN 53517 | CS 120° C. | [%] |  | 113.5 | 97.2 | 81.4 | 80.4 | 74.4 | 77.1 |

C = comparison
Crosslinker B = 1,4-butanediol
CS = compression set
(E): Production of the corresponding cast elastomer was not possible.

Example 5

Production of a Stable Prepolymer in an Extruder

Equipment and devices used:
Twin-shaft extruder from Werner & Pfleiderer with 9 zones and 53 mm co-rotating shafts.
Raw materials used:
Polyester 1: Neopentyl glycol-started polycaprolactone (hydroxyl value 72)
Polyester 2: Modified polybutylene adipate with a hydroxyl value of 45 (EP 1 274 758) 1,4-Butanediol
NDI: 1,5-Naphthalene diisocyanate commercially available from Bayer MaterialScience AG under the name Desmodur® 15.
BHT (butylated hydroxytoluene): 2,6-di-tert-butyl-4-methylphenol
Preparation: NDI (Desmodur® 15) was introduced at room temperature into the hopper of a K-Tron powder metering feeder. Metering was adjusted to the desired metering rate.

A neopentyl glycol-started polycaprolactone polyester (hydroxyl value 72; Polyester 1) was placed in a storage container and 500 ppm of antioxidant (BHT) were added. A Zenith B series gear pump (5.6 ml/rev) was adjusted with an Accurison controller. The flow rates are set out in Table 5 and were checked by means of a flow meter (Micro-motion mass flow meter).

The temperature profile of the extruder was set using a Partlow temperature controller and is likewise shown in Table 5. The equipment was heated for approximately 1 hour to the desired temperature.

The extruder was then started and the speed set to 290 rpm.
The two product streams were metered into zone 1 of the extruder and the extruder speed set to the values shown in Table 5. The reaction melt was removed from the reaction extruder using a hydraulic valve (Trendelkamp) and collected for further tests.

TABLE 5

Test parameters; production of an NCO prepolymer in an extruder

|  |  | Example 5 |
|---|---|---|
| Formulation: |  |  |
| Ratio by wt. of polyol to NDI |  | 80:21.625 |
| BHT in the polyol | [ppm] | 500 |
| Theoretical NCO content | [wt. % NCO] | 4.43 |
| Machine parameters: |  |  |
| Flow rate | [lb˟/hr] | 200 |
| Speed of rotation of shaft | [rpm] | 250 |

TABLE 5-continued

Test parameters; production of an NCO prepolymer in an extruder

|  |  | Example 5 |
|---|---|---|
| Temperature of shaft | [° C.] | 200 |
| Temperature of zone 1 | [° C.] | 200 |
| Temperature of zone 2 | [° C.] | 200 |
| Temperature of zone 3 | [° C.] | 100 |
| Temperature of zone 4 | [° C.] | 70 |
| Temperature of zone 5 | [° C.] | 70 |
| Temperature of discharge valve | [° C.] | 75 |
| Prepolymer properties: |  |  |
| Prepolymer temperature on discharge | [° C.] | approx. 100 |
| NCO content after storage for 16 hours at 60° C. | [wt. % NCO] | 4.22 |
| Appearance |  | clear |
| NCO content after storage for 24 hours at 80° C. | [wt. % NCO] | 4.22 |
| NCO content after storage for 24 hours at 23° C. | [wt. % NCO] | 4.26 |
| Viscosity (100° C.) | [mPas] | 1612 |

˟[lb: 1 lb corresponds to 453 g]

Production of Cast Elastomers Using the Prepolymer from Example 5

Example 6

According to the Invention 100 parts by weight of the NCO prepolymer from Example 1 stored for 3 months at room temperature were heated to 100° C. and degassed. 3.95 parts by weight of 1,4-butanediol were then stirred in. The reaction mixture was poured into molds preheated to 108° C. to 110° C., demolded after 18 minutes and conditioned in a circulating air drying oven for 16 hours at 110° C. The mechanical properties were determined (See Table 6.).

Example 7

According to the Invention 100 parts by weight of the NCO prepolymer from Example 5 stored for 3 months at room temperature were heated to 100° C., degassed and mixed with 27.5 parts by weight of polyester 2. After 15 minutes, a further 2.95 parts by weight of 1,4-butanediol were stirred in. The reaction mixture was poured into molds preheated to 108° C. to 110° C., demolded after 18 minutes and conditioned in a circulating air drying oven for 16 hours at 110° C. The mechanical properties were determined (See Table 6.).

Example 8

According to the Invention

Test 8 was performed in exactly the same way as described in Example 7. The amounts and results are shown in Table 6.

TABLE 6

| Polyurethane cast elastomers | | | | | |
|---|---|---|---|---|---|
| Formulation: | Example: | | 6 | 8 | 7 |
| | NCO prepolymer | [pts by wt.] | 100 | 100 | 100 |
| | NDI | [pts by wt.] | | | |
| | Polyester 2 | [wt. %] | | 13.8 | 27.5 |
| | NCO value, calculated | [wt. %] | 4.43 | 3.48 | 2.75 |
| | NCO value, experimental | [wt. %] | 4.21 | | |
| | 1,4-Butanediol | [wt. %] | 3.95 | 3.45 | 2.95 |
| Processing: | Prepolymer temperature | [° C.] | 100 | 100 | 100 |
| | Crosslinker temperature | [° C.] | 23 | 80 | 80 |
| | Casting time | [s] | 165 | 255 | 285 |
| | Release time | [min] | 9 | 17 | 20 |
| | Mold temperature | [° C.] | 110 | 110 | 110 |
| | Demolding after | [min] | 18 | 30 | 30 |
| Mechanical properties: | | | | | |
| DIN 53505 | Shore A hardness | [Shore A] | 94 | 92 | 89 |
| DIN 53505 | Shore D hardness | [Shore D] | 43 | 42 | 38 |
| DIN 53504 | Stress 50% | [MPa] | 9.68 | 6.51 | 5.15 |
| DIN 53504 | Stress 100% | [MPa] | 11.7 | 8.2 | 6.5 |
| DIN 53504 | Stress 300% | [MPa] | 16.8 | 13.2 | 10.6 |
| DIN 53504 | Yield stress | [MPa] | 37.5 | 40.6 | 43.1 |
| DIN 53504 | Elongation at break | [%] | 556 | 544 | 577 |
| | Graves | [kN/m] | 53.9 | 33.7 | 28.2 |
| | Impact resilience | [%] | 72 | 72 | 73 |
| DIN 53516 | Abrasion (DIN) | [mm$^3$] | 28 | 31 | 34 |
| DIN 53420 | Density | [g/mm$^3$] | 1.160 | 1.15 | 1.15 |
| DIN 53517 | CS 22° C. | [%] | 17.3 | 14.0 | 13.9 |
| DIN 53517 | CS 70° C. | [%] | 25.8 | 22.7 | 24.3 |
| DIN 53517 | CS 100° C. | [%] | 35.7 | 36.0 | 35.1 |
| | G' modulus, 0° C. | [MPa] | 37.11 | 19.2 | 23.1 |
| | G' modulus, 20° C. | [MPa] | 36.9 | 19.6 | 23.6 |
| | G' modulus, 50° C. | [MPa] | 35.97 | 19.8 | 23.5 |
| | G' modulus, 80° C. | [MPa] | 34.57 | 19.1 | 22.9 |
| | G' modulus, 110° C. | [MPa] | 34.69 | 19.4 | 23.2 |
| | tan δ, 0° C. | | 0.028 | 0.02 | 0.02 |
| | tan δ, 20° C. | | 0.015 | 0.01 | 0.01 |
| | tan δ, 50° C. | | 0.015 | 0.01 | 0.01 |
| | tan δ, 80° C. | | 0.011 | 0.01 | 0.01 |
| | tan δ, 110° C. | | 0.008 | 0.01 | 0.01 |
| | tan δ, max. at | [° C.] | −37 | −38 | −38 |
| | tan δ, min. at | [° C.] | 125 | 105 | 105 |
| | G" modulus, 0° C. | [MPa] | 1.03 | 0.56 | 0.45 |
| | G" modulus, 20° C. | [MPa] | 0.57 | 0.34 | 0.27 |
| | G" modulus, 50° C. | [MPa] | 0.52 | 0.34 | 0.28 |
| | G" modulus, 80° C. | [MPa] | 0.37 | 0.26 | 0.22 |
| | G" modulus, 110° C. | [MPa] | 0.27 | 0.22 | 0.20 |
| | Softening temperature | [° C.] | 175 | 170 | 170 |

The results set out in Table 6 show that after several months of storage, the NCO prepolymer based on Desmodur® 15 NDI and produced in the reaction extruder can be processed to form valuable PU cast elastomers Cast elastomers with an even lower hardness (than in Example 6) were obtained by stirring additional Polyester 2 into the short-chain diol shortly before the reaction (Examples 7 and 8).

Example 9

Using the same procedure as in Example 1, 100 parts by weight of a neopentylglycol-initiated poly-ε-caprolactone having a hydroxyl value of 72 mg KOH/g were dehydrated and mixed at 118° C. with 26.03 parts by weight of Desmodur® 15 (naphthalene diisocyanate from Bayer MaterialScience AG). After 11 minutes the reaction temperature rose to 130° C. (the end of the reaction). Then the mixture was divided into several batches which were exposed to different temperatures and storage times. The time required until the stated storage temperature was reached was in the minute range, since the quantities were relatively small. In order to be able to compare the measured results the viscosity was measured, independently of the previously adjusted storage temperature, at 100° C. using a "Physica MCR 51" viscosimeter from the Anton Paar company. The measurement of the NCO content was carried out using the method known to one skilled in the art (i.e., by reacting the product with excess dibutylamine, followed by back titration).

TABLE 7

| Test | Temperature at end of reaction [° C.] | Time to reach 110° C. [min] | Time to reach 90° C. [min] | Time to reach 70° C. [min] | Storage temperature [° C.] | Storage time till determination of viscosity [h] | Viscosity [mPas] at 100° C. | NCO content [wt. % NCO] | Residence time in the temperature segment A) [h] | B) [h] | C) [h] | D) [h] | Meets cooling requirement[1] |
|---|---|---|---|---|---|---|---|---|---|---|---|---|---|
| 9.0 | 130 | | | | 130 | 0 | 1450 | 3.86 | n.a. | n.a. | n.a. | n.a. | |
| 9.1 (comp.) | 130 | | | | 130 | 0.5 | 1550 | 3.83 | 0.5 | | | | A) |
| 9.2 (comp.) | 130 | | | | 130 | 1 | 1790 | 3.77 | 1 | | | | no |
| 9.3 (comp.) | 130 | | | | 130 | 2 | 2150 | 3.70 | 2 | | | | no |
| 9.4 (comp.) | 130 | | | | 130 | 4 | 4660 | 3.44 | 4 | | | | no |
| 9.5 (comp.) | 130 | 60 | | | 110 | 1.5 | 1640 | 3.82 | 0 | 1 | | | A) and B) |
| 9.6 (comp.) | 130 | 60 | | | 110 | 2 | 1710 | 3.81 | 0 | 2 | | | A) |
| 9.7 (comp.) | 130 | 60 | | | 110 | 4 | 2050 | 3.74 | 0 | 4 | | | A) |
| 9.8 (comp.) | 130 | 60 | | | 110 | 24 | 4820 | 3.62 | 0 | 24 | | | A) |
| 9.9 (comp.) | 130 | 7 | 55 | | 90 | 1 | 1590 | 3.83 | 0 | 0.12 | 1 | | A), B) and C) |
| 9.10 (comp.) | 130 | 7 | 55 | | 90 | 8 | 1680 | 3.79 | 0 | 0.12 | 8 | | A) and B) |
| 9.11 (comp.) | 130 | 7 | 55 | | 90 | 24 | 1860 | 3.66 | 0 | 0.12 | 24 | | A) and B) |
| 9.12 (comp.) | 130 | 7 | 55 | | 90 | 72 | 3230 | 3.43 | 0 | 0.12 | 72 | | A) and B) |
| 9.13 inv. | 130 | 4 | 12 | 50 | 70 | 8 | 1440 | 3.83 | 0 | 0.07 | 0.2 | 8 | A), B), C) and D) |

TABLE 7-continued

| | | | | | | | | | | | | | |
|---|---|---|---|---|---|---|---|---|---|---|---|---|---|
| 9.14 inv. | 130 | 4 | 12 | 50 | 70 | 24 | 1560 | 3.80 | 0 | 0.07 | 0.2 | 24 | A), B), C) and D) |
| 9.15 inv. | 130 | 4 | 12 | 50 | 70 | 48 | 1640 | 3.74 | 0 | 0.07 | 0.2 | 48 | A), B), C) and D) |
| 9.16 inv. | 130 | 4 | 12 | 50 | 70 | 72 | 1660 | 3.68 | 0 | 0.07 | 0.2 | 72 | A), B), C) and D) | inv. = according to the invention
comp. = comparison
[1]Cooling requirements =  A) prepolymer in the temperature range between the temperature at the end of reaction to 130° C. does not exceed ½ hour;
B) prepolymer in the temperature range from the temperature at the end of reaction to 110° C. does not exceed 1.5 hours;
C) prepolymer in the temperature range from the temperature at the end of reaction to 90° C. does not exceed 7.5 hours; and
D) prepolymer in the temperature range from the temperature at the end of reaction to 70° C. does not exceed 72 hours.

Table 7 shows that NCO prepolymers have the lowest viscosity, i.e. can be processed most readily, if they are cooled as quickly as possible to the lowest possible temperatures. In Examples 9.13 to 9.16, the maximum residence times are adhered to and prepolymers with low viscosities are obtained.

It is thus important for all 4 parameters to be adhered to. If, for example, a prepolymer is kept at 130° C. for 4 hours (test 9.4), it already has an unacceptable viscosity of 4,660 mPas.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A process for the production of a stable NCO prepolymer having an NCO content of from 2.5 to 6 wt. % and a viscosity at 100° C. of 5000 mPas comprising:
 a) reacting
  (1) a polyisocyanate having a melting point greater than 70° C. with
  (2) one or more polyols, having an average molecular weight of 1000 to 3000 g/mol, a viscosity measured at 75° C. of 700 mPas and a functionality of 1.95 to 2.15,
  (3) optionally in the presence of auxiliary substances and additives, at a temperature of from 80° C. to 240° C. in a ratio of NCO to OH groups of from 1.55:1 to 2.35:1 to form a prepolymer,
 and
 b) rapidly cooling the prepolymer formed in a) in a manner such that the residence time of the prepolymer
  A) in the temperature range between the temperature at the end of a) to 130° C. does not exceed ½ hour and
  B) in the temperature range from the temperature at the end of a) to 110° C. does not exceed 1.5 hours and
  C) in the temperature range from the temperature at the end of a) to 90° C. does not exceed 7.5 hours and
  D) in the temperature range from the temperature at the end of a) to 70° C. does not exceed 72 hours,
 in which unreacted polyisocyanate still present after cooling is not removed and is present in an amount greater than 0.3 wt. % and less than 5 wt. %, based on the weight of the prepolymer.

2. The process of claim 1 in which the polyisocyanate having a melting point greater than 70° C. is 1,5-naphthalene diisocyanate.

3. The process of claim 1 in which the polyol is selected from the group consisting of polyester polyols, poly-ε-caprolactone polyols, polycarbonate polyols, polyether polyols, α-hydro-ω-hydroxypoly(oxytetramethylene) polyols and combinations thereof.

4. The process of claim 1 which is conducted on a continuous basis.

5. The process of claim 1 which is conducted on a batch basis.

* * * * *

UNITED STATES PATENT AND TRADEMARK OFFICE
CERTIFICATE OF CORRECTION

PATENT NO. : 8,110,704 B2  
APPLICATION NO. : 11/591779  
DATED : February 7, 2012  
INVENTOR(S) : Barnes et al.

Page 1 of 1

It is certified that error appears in the above-identified patent and that said Letters Patent is hereby corrected as shown below:

On title page Item (73) Assignees should read: Bayer MateiralScience LLC, Pittsburgh, PA (US); Bayer ~~MaterialSeince~~ MaterialScience AG, Leverkusen (DE)

Item (74) Attorney, Agent, or Firm should read - Lyndanne M. Whalen; ~~Nolasn~~ Noland J. Cheung Signed and Sealed this
Twenty-seventh Day of March, 2012

David J. Kappos
*Director of the United States Patent and Trademark Office*